(12) United States Patent
Olson et al.

(10) Patent No.: US 8,214,436 B2
(45) Date of Patent: *Jul. 3, 2012

(54) SYSTEM FOR DIGITAL YEARBOOK DELIVERY

(75) Inventors: Anthony M Olson, Dakota Dunes, SD (US); Jennifer Kay Winquist, Jefferson, SD (US); Joseph G Richard, Vermillion, SD (US)

(73) Assignee: Wolf Pack Products, LLC, North Sioux City, SD (US)

( * ) Notice: Subject to any disclaimer, the term of this patent is extended or adjusted under 35 U.S.C. 154(b) by 263 days.

This patent is subject to a terminal disclaimer.

(21) Appl. No.: 12/560,137

(22) Filed: Sep. 15, 2009

(65) Prior Publication Data

US 2010/0070579 A1 Mar. 18, 2010

Related U.S. Application Data

(60) Provisional application No. 61/096,872, filed on Sep. 15, 2008.

(51) Int. Cl.
*G06F 15/16* (2006.01)
(52) U.S. Cl. ........................ 709/205; 709/203
(58) Field of Classification Search .................. 709/205
See application file for complete search history.

(56) References Cited

U.S. PATENT DOCUMENTS

| | | | | |
|---|---|---|---|---|
| 5,900,876 A | * | 5/1999 | Yagita et al. | 715/776 |
| 6,493,734 B1 | * | 12/2002 | Sachs et al. | 715/212 |
| 6,839,878 B1 | * | 1/2005 | Icken et al. | 715/234 |
| 6,859,909 B1 | * | 2/2005 | Lerner et al. | 715/203 |
| 7,020,654 B1 | * | 3/2006 | Najmi | 1/1 |
| 7,143,357 B1 | * | 11/2006 | Snibbe et al. | 715/751 |
| 2002/0035697 A1 | * | 3/2002 | McCurdy et al. | 713/200 |
| 2002/0091584 A1 | * | 7/2002 | Clark et al. | 705/26 |
| 2002/0152215 A1 | * | 10/2002 | Clark et al. | 707/10 |
| 2002/0184189 A1 | * | 12/2002 | Hay et al. | 707/1 |
| 2003/0226101 A1 | * | 12/2003 | Glover | 715/500.1 |
| 2004/0088420 A1 | * | 5/2004 | Allen et al. | 709/229 |
| 2004/0145603 A1 | * | 7/2004 | Soares | 345/730 |
| 2004/0217884 A1 | * | 11/2004 | Samadani et al. | 340/995.14 |
| 2005/0081159 A1 | * | 4/2005 | Gupta et al. | 715/751 |
| 2005/0125725 A1 | * | 6/2005 | Gatt | 715/517 |
| 2005/0193015 A1 | * | 9/2005 | Logston et al. | 707/104.1 |

(Continued)

FOREIGN PATENT DOCUMENTS

JP 11031141 A * 2/1999

(Continued)

OTHER PUBLICATIONS

S. Wilson, Digital personalized yearbooks, Research Disclosure database No. 477072, Kenneth Mason Publications Ltd, Jan. 2004.*

(Continued)

*Primary Examiner* — Emmanuel L Moise
*Assistant Examiner* — Robert Shaw
(74) *Attorney, Agent, or Firm* — Frank Liebenow

(57) ABSTRACT

An application for a system for providing a digital yearbook includes a server, a terminal and a database. The database is interfaced to the server and yearbook data is captured at the terminal, transferred to the server and stored in the database. The yearbook data is filtered and formatted based upon user profiles, creating customized views (subsets) of the yearbook for each of the users, including formatting and organizing the customized views for a desired viewing device of each user.

20 Claims, 22 Drawing Sheets

U.S. PATENT DOCUMENTS

| | | | |
|---|---|---|---|
| 2005/0209999 A1* | 9/2005 | Jou | 707/2 |
| 2005/0234864 A1* | 10/2005 | Shapiro | 707/1 |
| 2005/0261990 A1* | 11/2005 | Gocht et al. | 705/27 |
| 2005/0289461 A1* | 12/2005 | Amado et al. | 715/530 |
| 2006/0010073 A1* | 1/2006 | Fisher et al. | 705/51 |
| 2006/0129924 A1* | 6/2006 | Nelson et al. | 715/530 |
| 2006/0271691 A1* | 11/2006 | Jacobs et al. | 709/228 |
| 2007/0011607 A1* | 1/2007 | Lazareck et al. | 715/530 |
| 2007/0061487 A1* | 3/2007 | Moore et al. | 709/246 |
| 2007/0079001 A1* | 4/2007 | Ando et al. | 709/231 |
| 2007/0098364 A1* | 5/2007 | Toennis et al. | 386/95 |
| 2007/0130509 A1* | 6/2007 | Gombert et al. | 715/513 |
| 2007/0233562 A1* | 10/2007 | Lidwell et al. | 705/14 |
| 2008/0077595 A1* | 3/2008 | Leebow | 707/10 |
| 2008/0133658 A1* | 6/2008 | Pennington | 709/204 |
| 2008/0141108 A1* | 6/2008 | Matsuura | 715/202 |
| 2008/0184127 A1* | 7/2008 | Rafey et al. | 715/736 |
| 2008/0209533 A1* | 8/2008 | Abrams et al. | 726/9 |
| 2008/0215615 A1* | 9/2008 | Hoover et al. | 707/103 R |
| 2008/0243828 A1* | 10/2008 | Reztlaff et al. | 707/5 |
| 2008/0270470 A1* | 10/2008 | Buck et al. | 707/104.1 |
| 2009/0070426 A1* | 3/2009 | McCauley et al. | 709/205 |
| 2009/0089385 A1* | 4/2009 | Du | 709/206 |
| 2009/0119590 A1* | 5/2009 | Kondziela et al. | 715/716 |

FOREIGN PATENT DOCUMENTS

| | | | |
|---|---|---|---|
| JP | 2002042145 A | * | 2/2002 |
| JP | 2004139517 A | * | 5/2004 |
| JP | 2005182723 A | * | 7/2005 |

OTHER PUBLICATIONS

YearbookInteractive (YBI), Nov. 17, 2006 http://web.archive.org/web/20061117141225/http://www.yearbookinteractive.com/lifetouch/index.html (downloaded Sep. 12, 2011).*

* cited by examiner

SYSTEM FOR DIGITAL YEARBOOK DELIVERY

CROSS REFERENCE TO RELATED APPLICATIONS

This application takes priority from U.S. Provisional application titled "SYSTEM FOR DIGITAL YEARBOOK DELIVERY," Ser. No. 61/096,872, filed Sep. 15, 2008. This application is related to U.S. application Ser. No. 12/560,226 titled, "SYSTEM FOR DIGITAL YEARBOOK DELIVERY WITH MULTI-MEDIA DATA," which was filed on even date herewith; and inventors Anthony M. Olson, Jennifer Kay Winquist and Joseph G Richard. This application is also related to U.S. application Ser. No. 12/560,148 titled, "SYSTEM FOR INDIVIDUALLY CUSTOMIZED DIGITAL YEARBOOK DELIVERY," which was filed on even date herewith; and inventors Anthony M. Olson, Jennifer Kay Winquist and Joseph G Richard.

FIELD OF THE INVENTION

This invention relates to the field of publishing and more particularly to a system for delivery of yearbook content.

BACKGROUND

The present invention relates to the delivery of yearbook content. Yearbooks are, generally, collections of related photographs, images, descriptions, writings and, now, video, often commemorating school activities and accomplishments. Often such are related to a particular class, military group, or other group of people such as a high school graduating class or a corporate division or department. Yearbooks provide memories to students long after they graduate and a method of finding or remembering people in organizations as they grow and shrink.

Originally, yearbooks consisted of a published book of photographic images. Each student had their class picture taken early in the year and the book is published, printed and distributed, hopefully well in advance of graduation so students were able to obtain signatures, notes, etc., of their closest friends. Although this form of yearbook worked for many years, it does have its drawbacks. First, due to publishing turnaround time, it required all content to be ready well in advance of graduation and therefore did not contain content from the last half of the graduating year. Second, it is very difficult to make changes after printing unless overlay stickers are provided. Third, it is expensive to produce and print books and, fourth, the book itself consumes natural resources to produce including paper, ink, etc.

With current technology, the publishing process of a yearbook has been dramatically improved with software tools designed for content creation and formatting, digital cameras and advanced printing presses. This expedites the creation of a yearbook, but the end user is still left with a paper book of flat images. Whatever content was created early in the graduating year is digitized, edited, organized and, once finished, used to publish the printed yearbooks. There were no provisions for individuality. No provisions for one student to annotate another student's yearbook and no provisions for making the digital yearbook resemble the paper yearbook that users are accustom to seeing.

Recently, the advent of home computers, digital books, digital televisions and home media players provide new avenues for digital publishing. The resolutions of high-definition televisions and computers are certainly sufficient for reproducing page-like photographic images and high-quality text.

Prior attempts at digital yearbook creation included digital editing to produce a paper yearbook. There was only one output format for all users, not taking into account that some users had computers, some had DVD players, some had electronic books, some had cellular phones, etc.

What is needed is a system for creation and custom delivery of yearbook content in a digital format to various classes of user devices.

SUMMARY

The present invention provides, among other things, an improved electronic yearbook including features encompassing that of a paper, bound yearbook in electronic format. The present invention provides, for example, features for users to customize views of their own personal yearbook as well a variety of delivery modes that are compatible with a wide range of output devices such a computers, cell phones, personal digital assistants, televisions and home theatre systems. Being digital, the yearbook lives well beyond its publish date through, for example, updates, web based social networks, media distributions, etc. Likewise, alternate content is anticipated that enhances the yearbook experience, delivered with the yearbook or as auxiliary links. Alternate content examples are current music, current video, current news headlines, advertisements, etc.

In one embodiment, a system for providing a digital yearbook includes a server with a personal computer connected to the server through a network. There are several user devices selected from at least two types of user devices and each of the user devices are associated with a user of the digital yearbook. A database is coupled to the server and a first software module running on the server receives yearbook data from the personal computer through the network and stores the yearbook data in the database. For each user of the digital yearbook, a second software module running on the server extracts a subset of the yearbook data, filters the subset of yearbook data according to a user profile and formats the subset of yearbook data according to a target device of the at least two user devices then saves the subset of yearbook data. The subset of the yearbook data is then delivered to each of the plurality of user devices.

In another embodiment, a method for providing a digital yearbook includes capturing content for a yearbook into a database, editing and organizing the content within the database. Next, customized data is created from the content based on a user profile of a particular user of a set of users and based on a target device of the user and the customized data is delivered to the target device associated with the particular user where the customized data is presented at the target device. There are at least two different classes of target devices.

In another embodiment, a method for providing a digital yearbook is disclosed. The method is performed by a computer having instructions stored on a computer media, the computer media interfaced to a computer, the computer executing the instructions to implement the method comprising of capturing content for a yearbook into a database and editing and organizing the content within the database. Customized data is created from the content based on a user profile of a particular user of a set of users, the user profile including an indication of a target device used by the user. The customized data is delivered to the target device where it is presented. There are at least two different classes of target devices.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
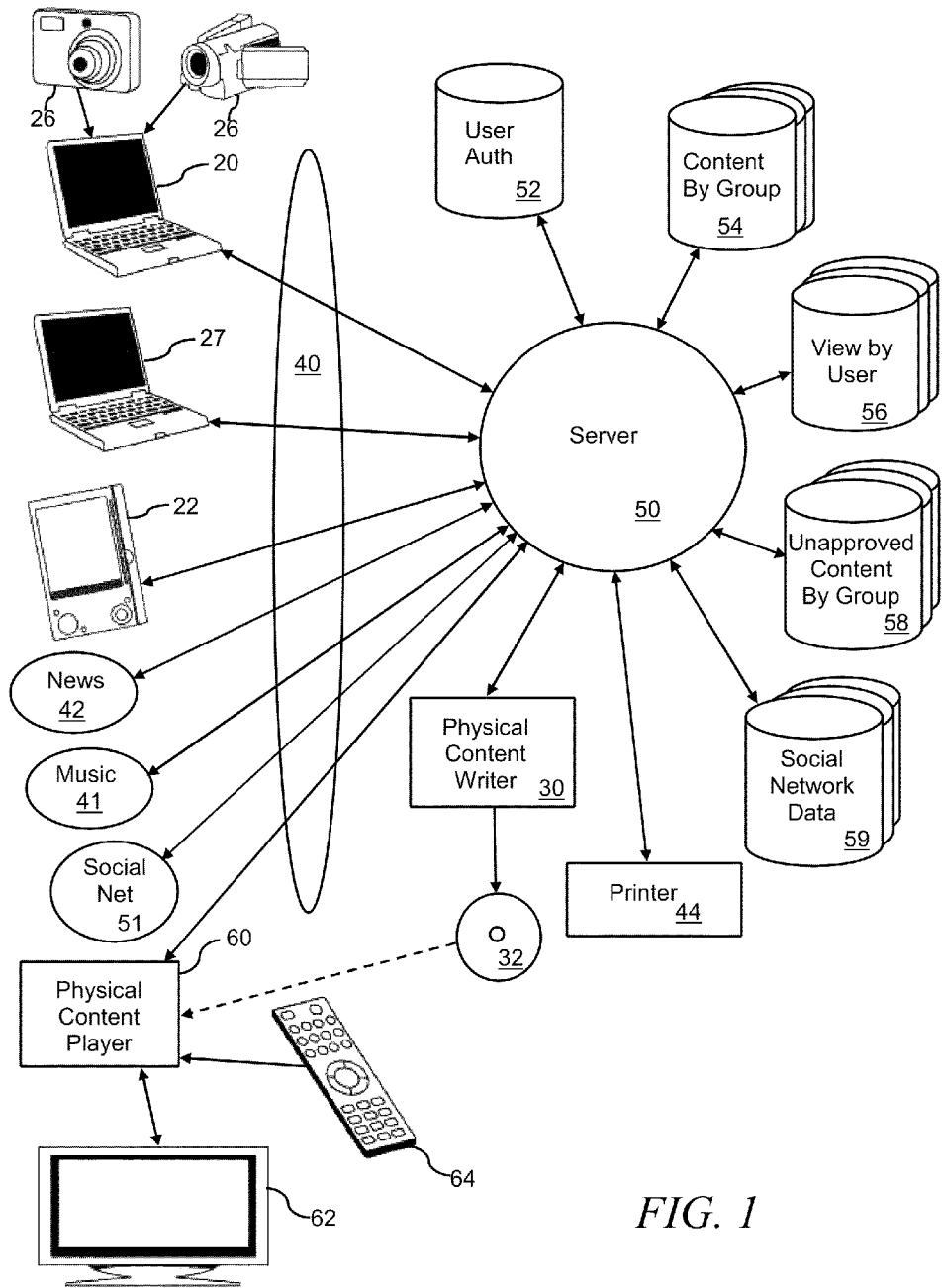
FIG. 1 illustrates a system view of a digital yearbook system of the present invention.

Reference will now be made in detail to the presently preferred embodiments of the invention, examples of which are illustrated in the accompanying drawings. Throughout the following detailed description, the same reference numerals refer to the same elements in all figures.

Throughout this description, the term yearbook refers to a publication, whether in paper or electronic form. This publication typically includes information and images of members of an organization at a certain point in time. The best example of such is a high school yearbook which typically includes pictures/images of each student, picture/images of the school and activities and various writings. The present invention further includes other forms of content not available with a paper yearbook such as video segments, music, current events, audio segments (e.g., voice signatures), etc.

Throughout this description, the term "group" refers to a set of people such as a graduating class (e.g., class of 2025) along with other significant individuals such as teachers, aides and administrators. Another example of such a group is a corporate entity such as an entire company, division, department, etc.

Throughout this description, the term cellular phone is used for any phone that operates without a direct wire connection to a phone system by any wireless connection including all forms of cellular communication, all forms of satellite communication, etc. Throughout this description, the term personal computer indicates any computer device having a user interface for operation by a person.

Referring to FIG. 1, a system view of an exemplary digital yearbook system of the present invention is shown. Other architectures are anticipated and work equally well to deliver the yearbook system of the present invention. In this example, a server 50 is central to the digital yearbook system. The server 50 has access to data storage systems 52/54/56/58/59 (e.g., file systems or databases). In the system shown, the server has a user authentication file 52, a file for storing content by group 54, a file for storing views by user 56, a file for storing unapproved content by group 58 and a file for storing social network data 59. Other organizations of data in different configurations of files are anticipated.

Any number of content creators 20 is connected to the server 50. In this example, one or more cameras 26 (e.g. digital still camera or video camera) are interfaced with the content creator 20 for capturing and uploading images or video. Each content creator 20 locally authors content using available image, text and/or video manipulation tools. Once the image, text and/or video is ready to be included in the yearbook, the image, text and/or video is uploaded to the server 50 and is stored in the unapproved content by group file 58 for the given group. The person uploading the content is authorized to perform such uploads by the server 50 using the user authentication file 52.

At a later time, an editor with responsibility for screening inappropriate content accesses the server, in some embodiments from a different terminal device 27, and reviews any new content that is stored in the unapproved content by group file 58 and, if approved, that content is transferred into the content by group file 54.

The file for storing content by group 54 contains all approved content for each specified group. For example, for a particular high school (e.g., Universal High School or UHS), all approved content is stored in the content by group file 54. The content for one organization is kept separate so that it doesn't get mixed-up with content from another organization. In the preferred embodiment, the content by group 54 is sliced or filtered by entries in a view by user file 56. The view by user file 56 contains directives segmented by user and by group, such that, one or more user (e.g., student) is provided a unique view, display, output of the content by group 54, thereby optionally providing custom yearbook view for each user. In some embodiments, multiple users share a single view such that all have/see the same yearbook; for example, a view for the entire football team.

In some embodiments, external content is integrated into the content by group 54 such as music, video, news, etc. The external content is provided by various providers such as music providers or music download services 41 and news providers 42 such as local newspapers, etc. Such external content provides yearbook users with a snap-shot of the world during a special timeframe such as the years the user attended high school. This snap-shot includes, for example, popular songs, art, fashion and headlines. In some embodiments, the external content is provided under fair use copyright law such as a limited portion of each song, etc. In some embodiments, complete content is provided such as the complete top-10 songs from each year of high school, etc. In the latter, the content is licensed from the copyright owner (e.g., payment is made) and the users (e.g., students) have an option to include the songs in their yearbook for a fee.

In some embodiments, the yearbook is accessible through a network 40 (e.g. the Internet) by users 22 while production is in progress. In such, the content by group 54 is available through a user interface to a user's 22 browser. For example, all currently approved yearbook media for a given group (e.g., "class of 2025") is accessible. In some embodiments of such, the content by group 54 is filtered by one or more views by user 56.

Once the yearbook is complete, there are several ways for a yearbook recipient to obtain/access the yearbook. One delivery mechanism is the traditional printed yearbook. For this delivery method, the content by class 54 is sent to a printer 44. In some embodiments of such, the content sent to the printer is filtered by the views by user 56, thereby providing personalized printed yearbooks for each user (e.g., student).

Another delivery mechanism is in physical media 32, such as a compact disk (CD), Digital Video Disk (DVD), Blue Ray Disk, etc. In such, for each user, their formatted content is copied from the content by group file 54 optionally using filters from the view by user file 56 to a physical media 32 by a content writer 30 (e.g., DVD writer). For content filtered by the view by user file 56, each user will have a unique 32 media customized to their preferences. For content that is not filtered by the view by user file 56, each user will have the same physical media 32. Once delivered to the user device 60, the media 32 is inserted/installed into a user device (e.g. content player) 60 designed to present the content from the media 32 on a display (either internal or an external device such as a television 62). Any known user device 60 is anticipated, including, but not limited to, a media player (e.g. DVD, Blue Ray, CD), a computer (e.g. PC), a dedicated disk player (e.g., portable DVD player), a networked video player, an electronic book, a cellular phone, etc. In some embodiments, the user device 60 is controlled by a remote control 64.

In some embodiments, the user device 60 (content player) has access to the server 50 through the network 40 (e.g., a connected DVD player or a computer). In embodiments in which the user device 60 is connected to the server 50, the content is delivered to the user device 60 either using media 32 (as described above) or by sending the content to the user device 60 over the network 40. Also, in some embodiments when the user device 60 has network access to the server 50, the user is provided with enhanced services such as updates, overlays, current data, controls, etc. For example, updated photographs of each student are provided from class reunions or a correction is provided that was discovered after the physical media 32 was distributed.

In some embodiments, the server also supports social network functionality. There are many known social networks such as Facebook. Having social network functionality integrated into a yearbook system as per the present invention provides many features/advantages. For instance, when students graduate from high school, they are automatically members of a social network that is pre-loaded with their classmates. Such helps keep them in touch with other students as well as other new members that subsequently enter the social network. In some embodiments, the social network capabilities are integrated into the present invention by having the server 50 perform all social networking tasks. The user data and histories are stored in a file 59 or database accessible to the server. The file or database 59 contains, for example, social network user data, creative works, uploaded images, voice, user biographies, etc.

In other embodiments, the server 50 interfaces with an external social network 51 through the Internet 40. For example, the server connects with a service such as Facebook to provide social network access and functions currently/normally available on such social networks.

Figure 2:
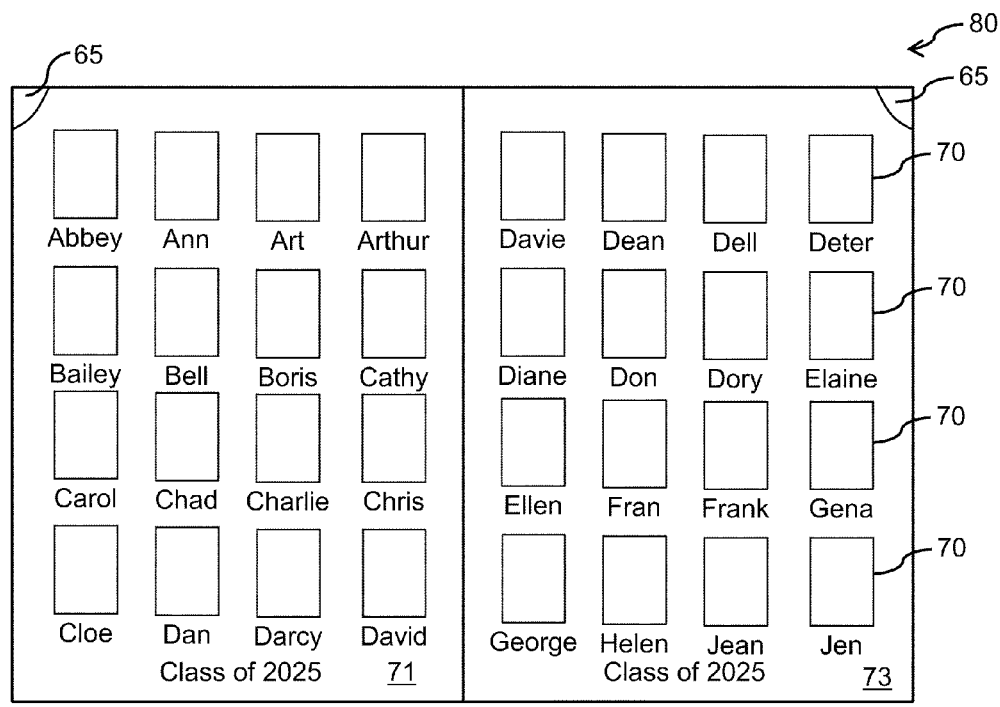
FIG. 2 illustrates a first typical user interface of the present invention showing yearbook pictures.

Referring now to FIG. 2, a first typical user interface of the present invention showing yearbook pictures is shown. In this user interface 80, there are two virtual paper pages 71/73 of photographs 70, similar to a typical printed yearbook. In this example, photographs 70 of a subset of all students are shown, typically in alphabetical order. An icon 65 is provided to page forward/backward. By clicking and holding onto the page turn icons 65 then pulling it right (or left for opposite page), the user will turn the page to the previous (next page). Any user interface is anticipated and the interface shown in FIG. 2 is one example.

Figure 2A:
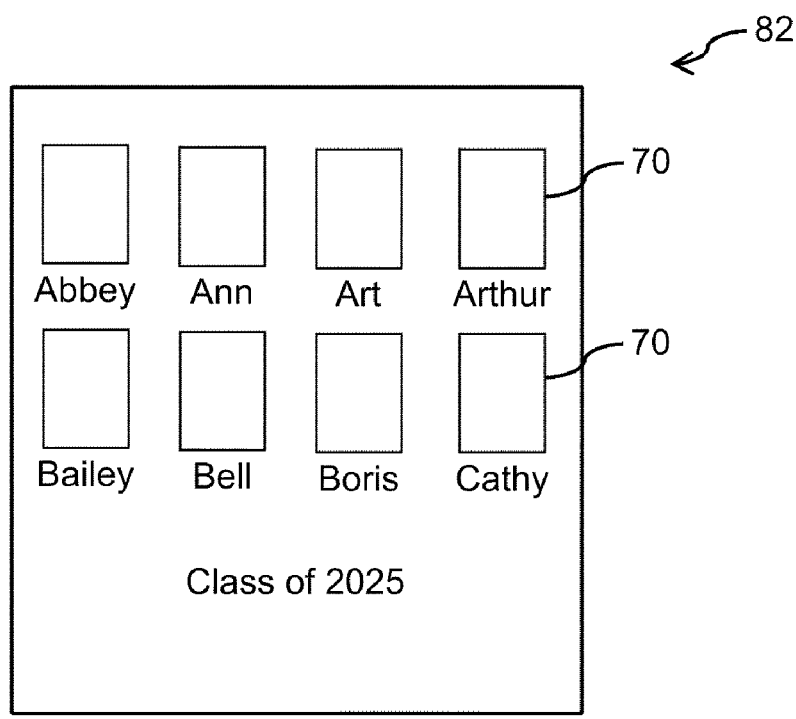
FIG. 2A illustrates a second typical user interface of the present invention showing yearbook pictures.

Referring now to FIG. 2A, a second typical user interface of the present invention showing yearbook pictures is shown. In this exemplary user interface 82, there is one page of photographs 70, similar to what might be viewed on a limited display device such as a PDA or a personal video player. In this example, some photographs 70 of all of the students are shown. In this example, hard keys such a left and right arrow keys are used to page through the photographs 70. In some embodiments, page numbers are entered to skip directly to a desired page.

Figure 3:
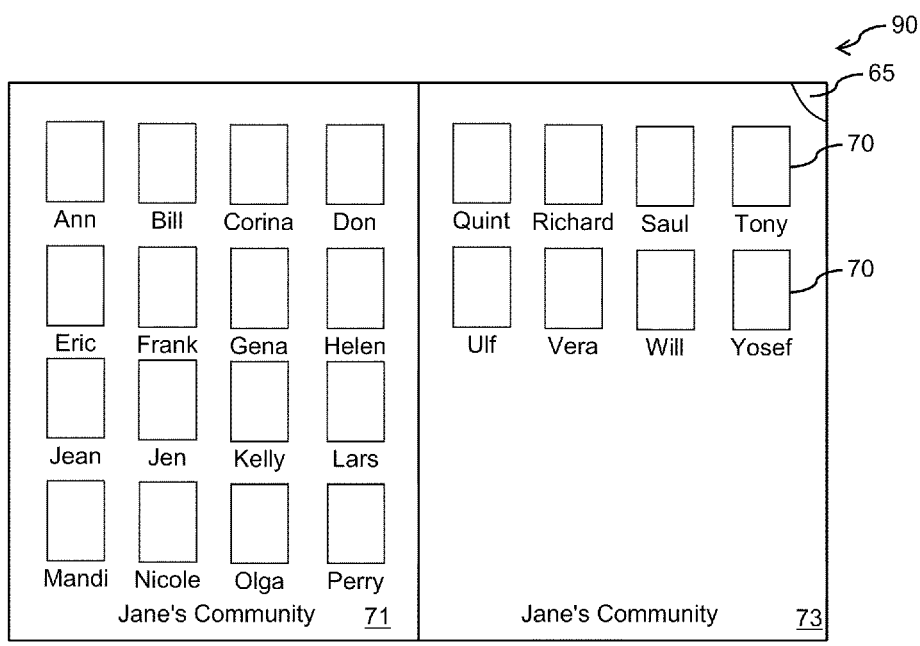
FIG. 3 illustrates the first typical user interface of the present invention showing yearbook pictures selected by a first user.

Referring now to FIG. 3, the first typical user interface of the present invention showing yearbook pictures selected by a first user is shown. In this user interface 90, there are two virtual paper pages 71/73 of photographs 70, similar to a typical printed yearbook. In this example, photographs 70 of a subset of all students that were selected by a first user (Jane) are shown. This is an example of how a user (Jane) customizes her yearbook by selecting one or more other user's photographs 70 to display them on a "favorites" page. Again, an icon 65 is provided to page forward/backward. By clicking and holding on of the page turn icons 65 then pulling it right (or left for opposite page), the user will turn the page to the previous (next page). Any user interface is anticipated and the interface shown in FIG. 3 is one example.

Figure 3A:
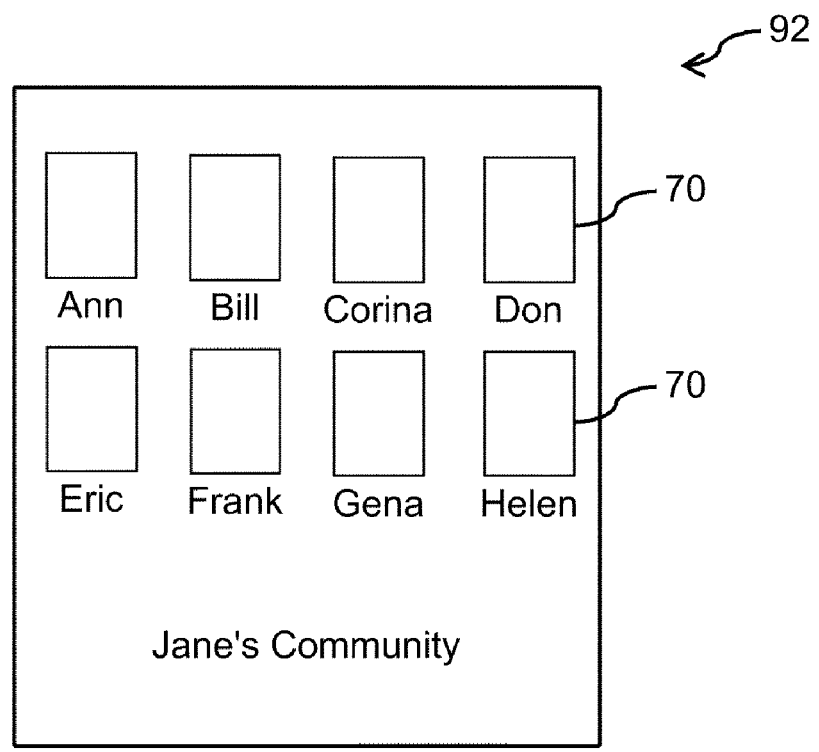
FIG. 3A illustrates the second typical user interface of the present invention showing yearbook pictures selected by a first user.

Referring now to FIG. 3A, the second typical user interface of the present invention showing yearbook pictures selected by a first user is shown. In this exemplary user interface 92, there is one page of photographs 70, similar to what might be viewed on a limited display device such as a PDA or a personal video player. In this example, photographs 70 of a subset of all students that were selected by a first user (Jane) are shown. This is an example of how a user (Jane) customizes her yearbook by selecting one or more other user's photographs 70 to display them on a "favorites" page. Paging, in this example, uses hard keys such a left and right arrow keys to page through the photographs 70. In some embodiments, page numbers are entered to skip directly to a desired page.

Figure 4:
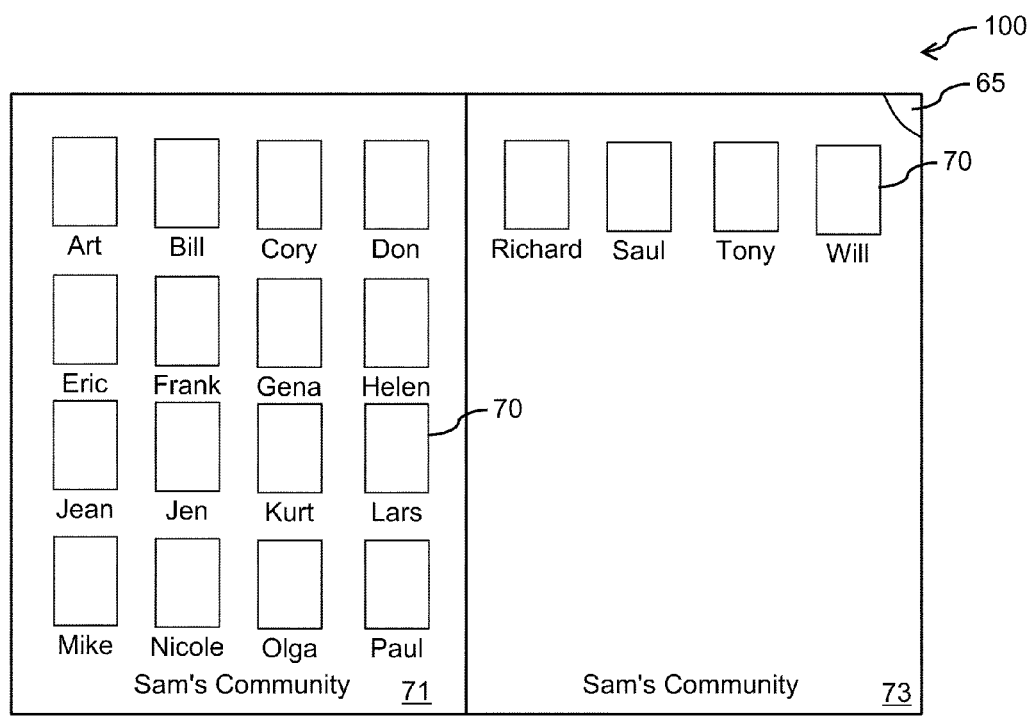
FIG. 4 illustrates the first typical user interface of the present invention showing yearbook pictures selected by a second user.

Referring now to FIG. 4, the first typical user interface of the present invention showing yearbook pictures selected by a second user is shown. In this user interface 100, there are two virtual paper pages 71/73 of photographs 70, similar to a typical printed yearbook. In this example, photographs 70 of a subset of all students that were selected by a second user (Sam) are shown. This is an example of how a user (Sam) customizes his yearbook by selecting one or more other user's photographs 70 to display them on a "favorites" page. Again, an icon 65 is provided to page forward/backward. By clicking and holding on of the page turn icons 65 then pulling it right (or left for opposite page), the user will turn the page to the previous (next page). Any user interface is anticipated and the interface shown in FIG. 4 is one example.

Figure 4A:
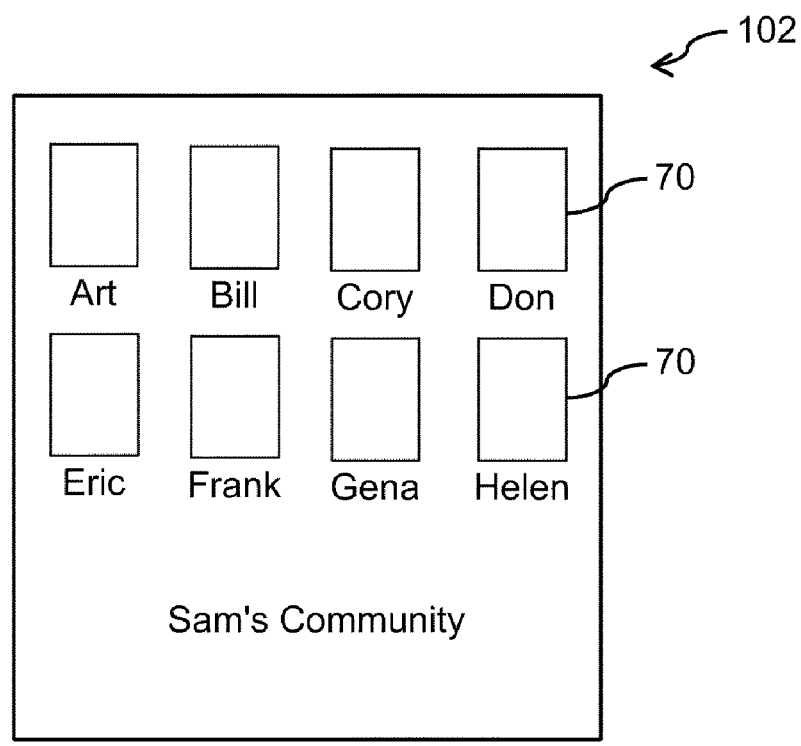
FIG. 4A illustrates the second typical user interface of the present invention showing yearbook pictures selected by a second user.

Referring now to FIG. 4A, the second typical user interface of the present invention showing yearbook pictures selected by a second user is shown. In this exemplary user interface 102, there is one page of photographs 70, similar to what might be viewed on a limited display device such as a PDA or a personal video player. In this example, photographs 70 of a subset of all students that were selected by a second user (Sam) are shown. This is an example of how a user (Sam) customizes his yearbook by selecting one or more other user's photographs 70 to display them on a "favorites" page. Paging, in this example, uses hard keys such a left and right arrow keys to page through the photographs 70. In some embodiments, page numbers are entered to skip directly to a desired page.

Figure 5:
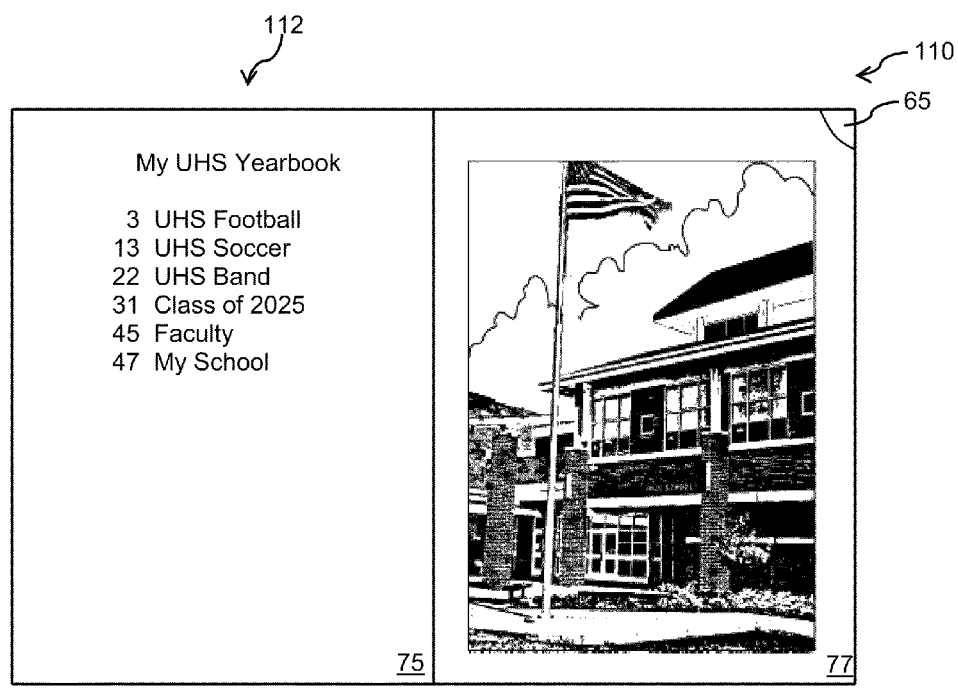
FIG. 5 illustrates the first typical user interface of the present invention showing a yearbook table of contents.

Referring now to FIG. 5, the first typical user interface of the present invention showing a yearbook table of contents is shown. In this user interface 110, there are two virtual paper pages 75/77, similar to a typical printed yearbook table of contents. In this example, a high school has a format with a table of contents page 75 and a page with a photograph of the front of the high school 77. The table of contents page 75 contains a table of contents 112 similar to that which is in a typical yearbook including sections for Football (page 3), Soccer (page 13), Band (page 22), class photographs (page 31), Faculty (page 45) and photographs of the high school (page 47). Again, an icon 65 is provided to page forward/backward. By clicking and holding on of the page turn icons 65 then pulling it right (or left for opposite page), the user will turn the page to the previous (next page). In some embodiments, clicking on a table of contents entry results in directly addressing the first page of the associated section. Any user interface is anticipated and the interface shown in FIG. 5 is one example.

Figure 6:
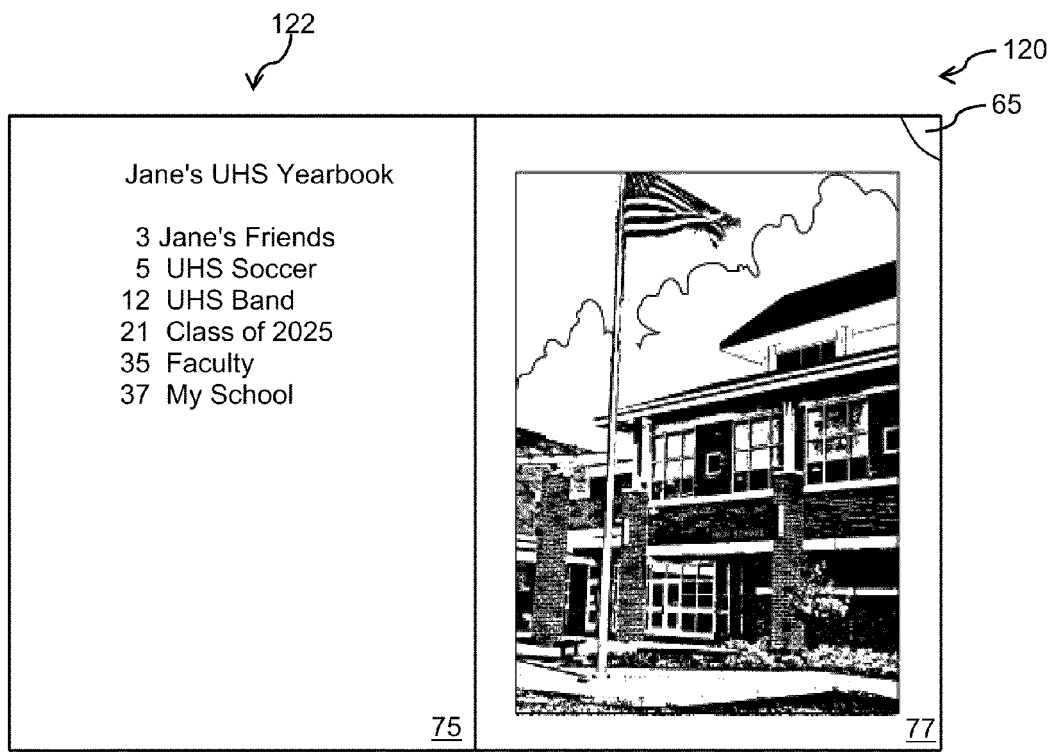
FIG. 6 illustrates the first typical user interface of the present invention showing a yearbook table of contents customized for the first user.

Referring now to FIG. 6, the first typical user interface of the present invention showing a yearbook table of contents customized for the first user is shown. In this user interface 120, there are two virtual paper pages 75/77, similar to a typical printed yearbook table of contents. In this example, a high school has a format with a table of contents page 75 and a page with a photograph of the front of the high school 77. The table of contents page 75 of this user interface 120 contains a table of contents 122 customized for the first user (Jane) including sections selected by/for Jane: Jane's Friends (page 3), Soccer (page 5), Band (page 12), class photographs (page 21), Faculty (page 35) and photographs of the high school (page 37). In this example, Jane has two custom selected pages of photographs of her friends and she is not involved in Football and has decided not to include the Football section in her yearbook. Again, an icon 65 is provided to page forward/backward. By clicking and holding on of the page turn icons 65 then pulling it right (or left for opposite page), the user will turn the page to the previous (next page). In some embodiments, clicking on a table of contents entry results in directly addressing the first page of the associated section. Any user interface is anticipated and the interface shown in FIG. 6 is one example. Likewise, there are many known ways to customize the look and functionality per a user's desires including customized screen appearances, customized action buttons, voice, images, signatures, writings, colors, etc, all of which are included here within.

Figure 7:
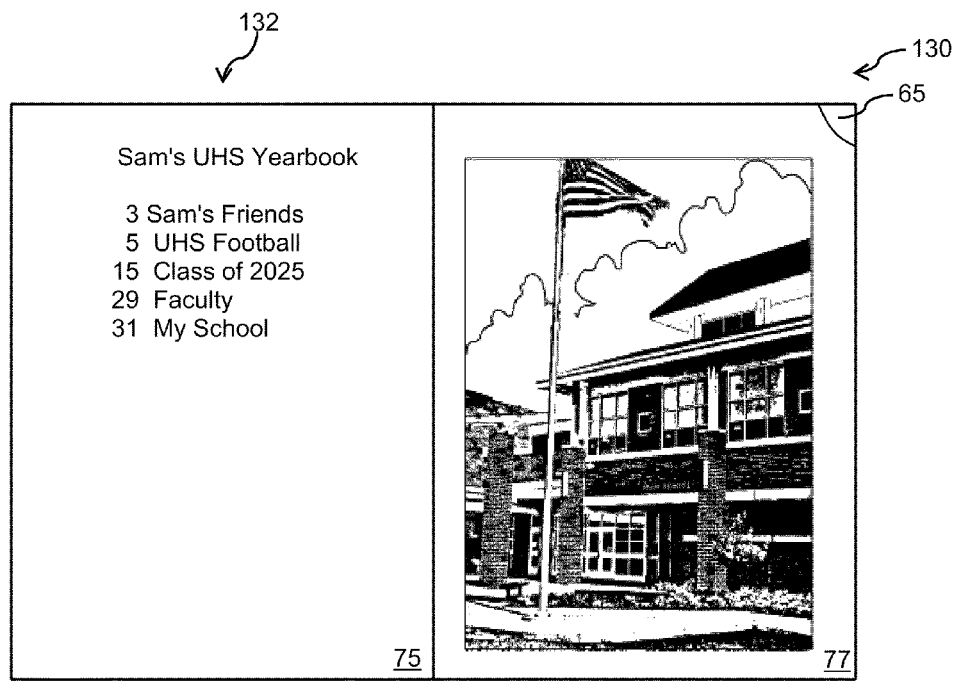
FIG. 7 illustrates the first typical user interface of the present invention showing a yearbook table of contents customized for the second user.

Referring now to FIG. 7, the first typical user interface of the present invention showing a yearbook table of contents customized for the second user is shown. In this user interface 130, there are two virtual paper pages 75/77, similar to a typical printed yearbook table of contents. In this example, a high school has a format with a table of contents page 75 and a page with a photograph of the front of the high school 77. The table of contents page 75 of this user interface 130 contains a table of contents 132 customized for the second user (Sam) including sections selected by/for Sam: Sam's Friends (page 3), Football (page 5), class photographs (page 15), Faculty (page 29) and photographs of the high school (page 31). In this example, Sam has two custom selected pages of photographs of his friends and he is not involved in Soccer or Band and has decided not to include the Soccer or Band sections in his yearbook. Again, an icon 65 is provided to page forward/backward. By clicking and holding on of the page turn icons 65 then pulling it right (or left for opposite page), the user will turn the page to the previous (next page). In some embodiments, clicking on a table of contents entry results in directly addressing the first page of the associated section. Any user interface is anticipated and the interface shown in FIG. 7 is one example.

Figure 8:
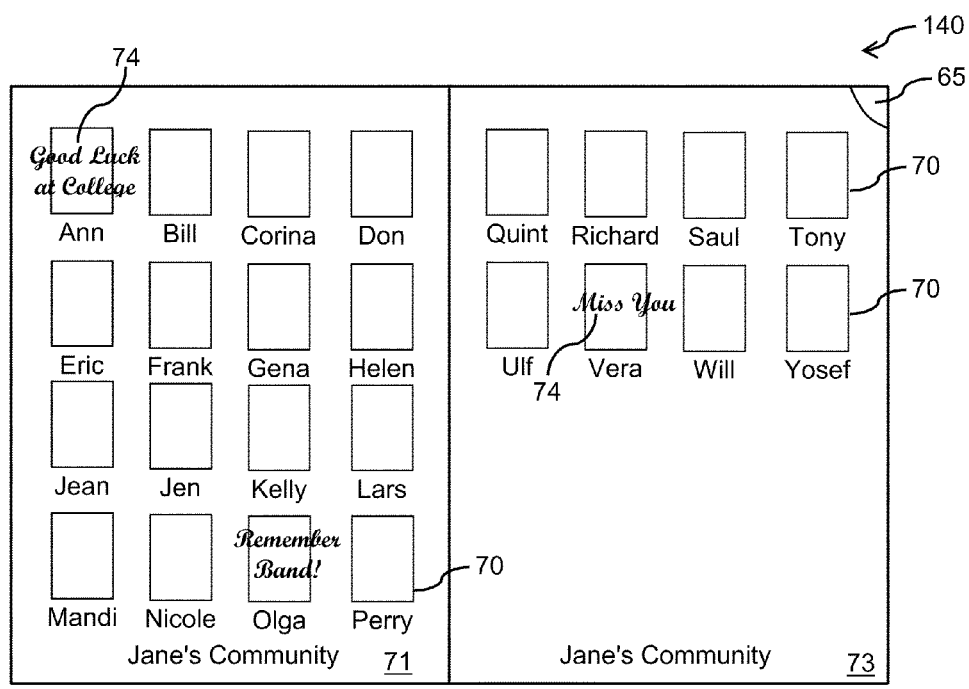
FIG. 8 illustrates the first typical user interface of the present invention showing yearbook pictures selected by a first user including text annotations.

Referring now to FIG. 8, the first typical user interface of the present invention showing yearbook pictures selected by a first user including text annotations is shown. In this user interface 140, there are two virtual paper pages 71/73 of photographs 70, similar to a typical printed yearbook. In this example, photographs 70 of a subset of all students that were selected by a first user (Jane) are shown similar to FIG. 3 except, in this example, some pictures 70 are signed or written upon 74 by other users. In the example shown, text messages 74 are overlaid upon the other user's photographs 70. In some embodiments, handwriting input is used to capture the signatures/messages 74 while in other embodiments, text messages 74 are overlaid over the pictures 70. In some embodiments, the text overlay 74 is made to be optionally visible so the user (Jane) is able to mute the text 74 and see the photographs 70 in their entirety. In some embodiments, the text overlay 74 is presented in a faded or translucent font to permit viewing of the photographs 70 with minimal distortion.

Again, an icon 65 is provided to page forward/backward. By clicking and holding on of the page turn icons 65 then pulling it right (or left for opposite page), the user will turn the page to the previous (next page). Any user interface is anticipated and the interface shown in FIG. 8 is one example.

Figure 8A:
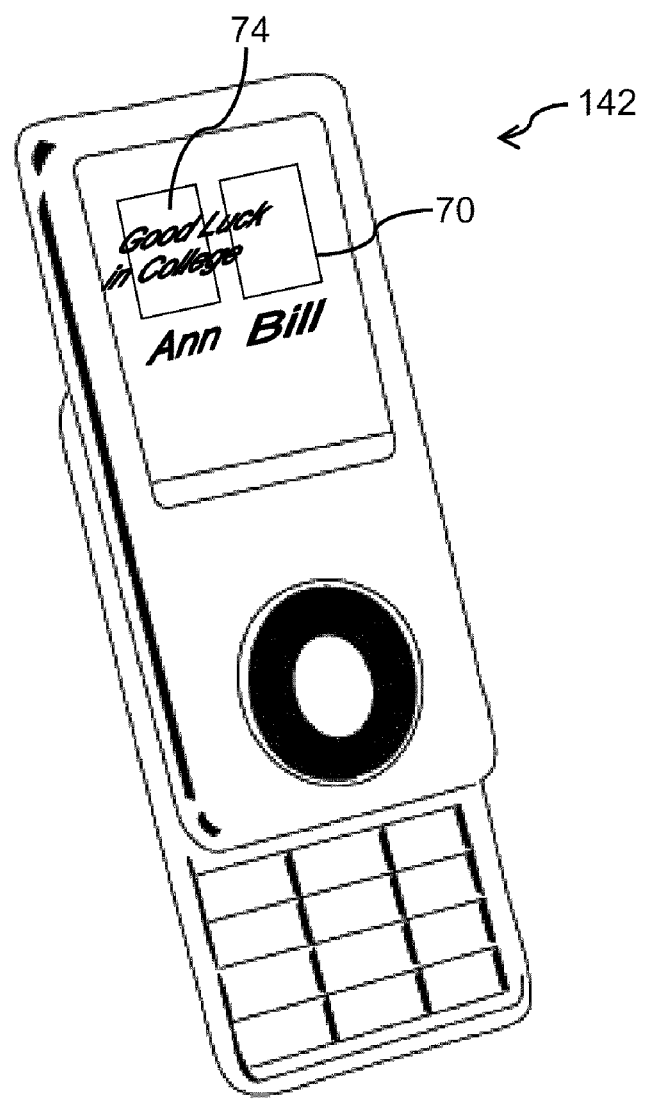
FIG. 8A illustrates a third typical user interface of the present invention showing yearbook pictures selected by a first user including text annotations.

Referring now to FIG. 8A, a third typical user interface of the present invention showing yearbook pictures selected by a first user including text annotations is shown. In this user interface 142, there is one virtual page of photographs 70, similar to what might be displayed on a cell phone or PDA. In this example, photographs 70 of a subset of all students that were selected by a first user (Jane) are shown. In this example, one picture 70 is signed or written upon 74 by another user. In the example shown, the text message 74 is overlaid upon the other user's photograph 70. In some embodiments, handwriting input is used to capture the signatures/messages 74 while in other embodiments, text messages 74 are overlaid over the pictures 70. In some embodiments, the text overlay 74 is made to be optionally visible so the user (Jane) is able to mute the text 74 and see the photographs 70 in their entirety. In some embodiments, the text overlay 74 is presented in a faded or translucent font to permit viewing of the photographs 70 with minimal distortion.

Figure 8B:
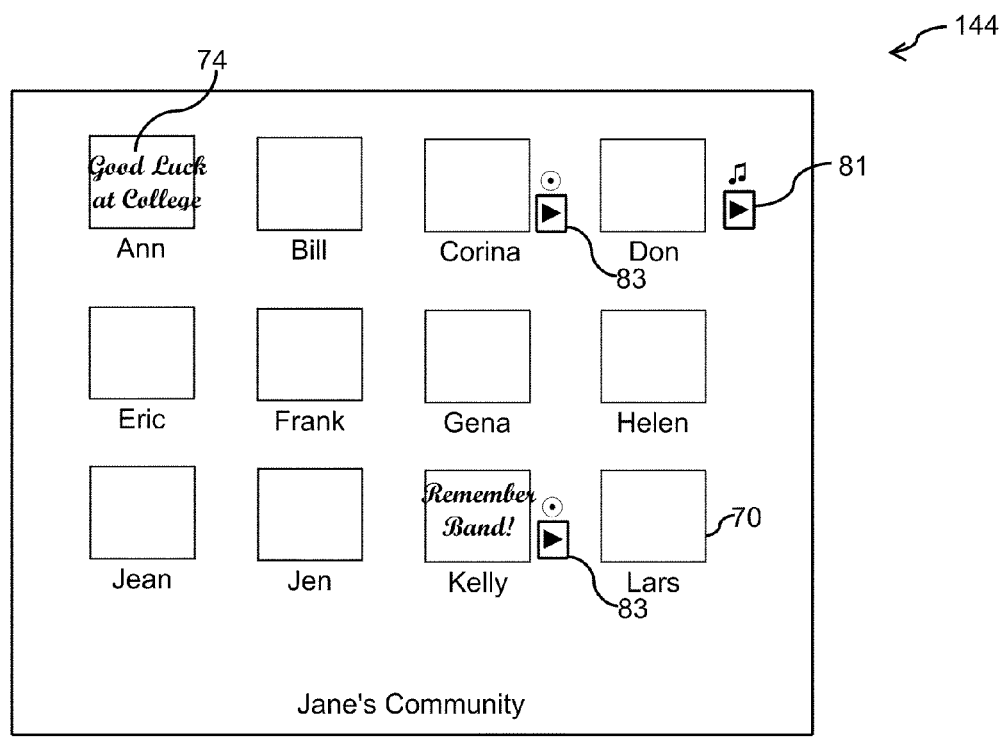
FIG. 8B illustrates a fourth typical user interface of the present invention showing yearbook pictures selected by a first user including text annotations, voice annotations and video annotations.

Referring now to FIG. 8B, a fourth typical user interface of the present invention showing yearbook pictures selected by a first user including text annotations, voice annotations and video annotations is shown. In this user interface 144, there is one virtual page of photographs 70, similar to a typical interface shown on a personal computer. In this example, photographs 70 of a subset of all students that were selected by a first user (Jane) are shown similar to FIG. 3 except, in this example, some pictures 70 are signed or written upon 74 by other users, similar to that of FIG. 8 and FIG. 8A. Additionally, in this example, video 83 and audio 81 annotations are associated with some photographs 70. For example, one of Jane's friends, Corina has created a video segment saying goodbye to Jane, and, to view that segment, Jane selects (clicks on) the "play" icon 83 associated with Corina's photograph 70. In some embodiments, the video segment is shown in a new window with controls for pause, replay, stop, etc., as known in the industry. In some embodiments, audio is included with the video segment as known in the industry. In some embodiments, the video segment is shown in place of the original photograph 70. Any location of playback, including alternate display devices is anticipated and included here within.

Another example is of another of Jane's friends, Don, who has created an audio segment saying, for example, goodbye to Jane, and, to listen to that segment, Jane selects (clicks on) the "play" icon 81 associated with Don's photograph 70. In some embodiments, the audio segment is played using a new window with controls for pause, replay, stop, etc., as known in the industry. In some embodiments, the audio segment is played and the play icon 81 is replaced with a stop icon until the audio segment completely plays. Any location of playback, including headphones, speakers, etc. is anticipated and included here within.

Figure 9:
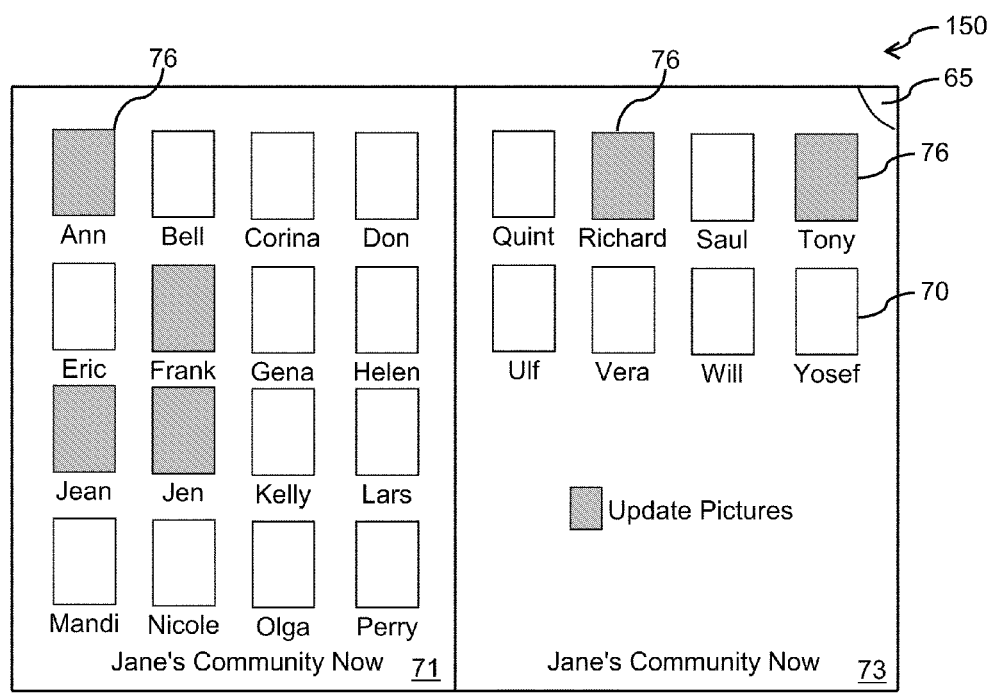
FIG. 9 illustrates the first typical user interface of the present invention showing yearbook pictures selected by a first user including updated pictures.

Referring now to FIG. 9, the first typical user interface of the present invention showing yearbook pictures selected by a first user including updated pictures is shown. In this user interface 150, there are two virtual paper pages 71/73 of photographs 70, similar to a typical printed yearbook. In this example, photographs 70 of a subset of all students that were selected by a first user (Jane) are shown. This is an example of how a user (Jane) customizes her yearbook by selecting one or more other user's photographs 70 to display them on a "favorites" page. In this user interface, some or all of the photographs 70 are replaced by updated photographs 76. This feature is made possible by the continuously available yearbook of the present invention. Since the content by group 54 is present on the server 50, users and administrators have the ability to change, update and add data including text, photographs, video, audio, etc., to, for example, the content by group file 54. For example, in some embodiments capabilities exist to add new text messages 74, video message 83 or audio messages 81 long after the yearbook is finalized (e.g., after graduation). Another example is the addition of updated photographs 76 as shown in FIG. 9. For instance, updated photographs 76 of the students are taken during the 10 year reunion and stored in the content by group file 54. The updated photographs 76 are not available to those users who have paper copies of the yearbook. For users who are connected to the network 40, the updated photographs 76 (text, audio, video, etc) are selectively available when they view their yearbook. In such, when the user accesses their yearbook, a connection is made from their viewing device (e.g., personal computer) to the server 50 through the network 40. In some embodiments, the user has a physical media (e.g., DVD disk) containing their yearbook. In this embodiment, the viewer software checks with the server 50 to find updated photographs 76 and, if found, uploads the updated photographs 76 to the user's device. In some embodiments, the updated photographs 76 are stored (cached) on the user's device (e.g., hard disk) to improve access time. In some embodiments, the user has an option to select the original photographs 70 or the updated photographs 76. In some embodiments, the user has an option to "morph" the photographs from the original photograph 70 into the updated photograph 76. Updates include, but are not limited to, updated photographs, text messages, audio messages, video messages, broadcast messages, alumni announcements, etc.

As before, an icon 65 is provided to page forward/backward. By clicking and holding on of the page turn icons 65 then pulling it right (or left for opposite page), the user will turn the page to the previous (next page). Any user interface is anticipated and the interface shown in FIG. 9 is one example.

Figure 10:
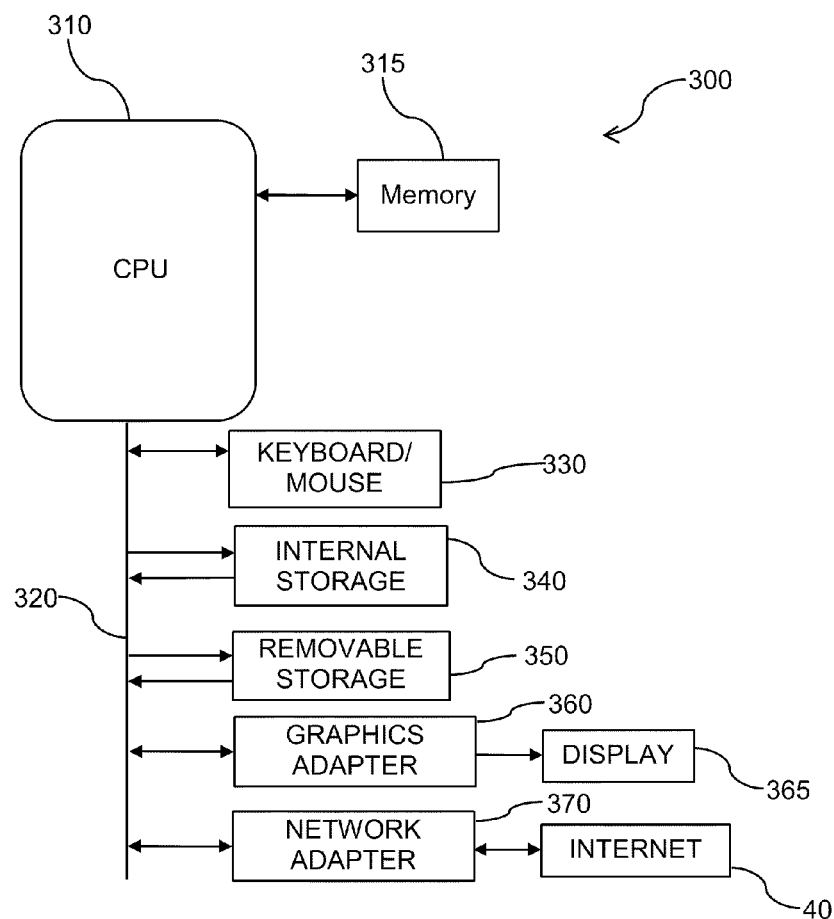
FIG. 10 illustrates a typical computer system of the present invention.

Referring to FIG. 10, a schematic view of a typical terminal device computer system 300 of the present invention will be described. This exemplary configuration is well known in the prior art. Although shown in a much simplified configuration having a single processor 310, many different computer architectures are known that accomplish similar results in a similar fashion and the present invention is not limited in any way to any particular computer system. The present invention works well utilizing a single processor system as shown; a multiple processor system where multiple processors share resources such as memory and storage; or a multiple server system where several independent servers operate in parallel or any combination. In this, a processor 310 is provided to execute stored programs that are generally stored for execution within the memory 315. The processor 310 can be any processor or a group of processors, for example an Intel Pentium-4® CPU or the like. The memory 315 is connected to the processor and can be any memory suitable for connection with the selected processor 310, such as SRAM, DRAM, SDRAM, RDRAM, DDR, DDR-2, etc. Also connected to the processor 310 is a system bus 320 for connecting peripheral subsystems such as a keyboard/mouse 330, internal storage 340, removable storage 350, graphics adapter 360 and network adapter 370. The graphics adapter 360 receives commands and display information from the system bus 320 and generates a display image that is displayed on the terminal's display 365. The network adapter 370 receives commands and data from the system bus 320 and communicates with the World Wide Web or Internet 40, through a modem or other communication device (not shown).

In some embodiment, there is internal storage 340 and removable storage 350. The internal storage 340 is used, for example, to store programs, executable code and data persistently, while the removable storage 350 is used, for example, to load programs, executable code, content and data from the media into the internal storage 340. The internal storage 340 is, for example, a hard disk drive, flash memory, etc. Other examples of persistent internal storage include core memory, FRAM, flash memory, battery-backed RAM, etc. Other examples of removable storage 350 include CDRW, DVD, DVD writeable, compact flash, flash "jump" drives, other removable flash media, floppy disk, ZIP®, laser disk, etc. In some embodiments, other devices are connected to the system through the system bus 320 or with other input-output connections. Examples of these devices include printers; mice; graphics tablets; joysticks; and communications adapters such as modems and Ethernet adapters.

Figure 11:
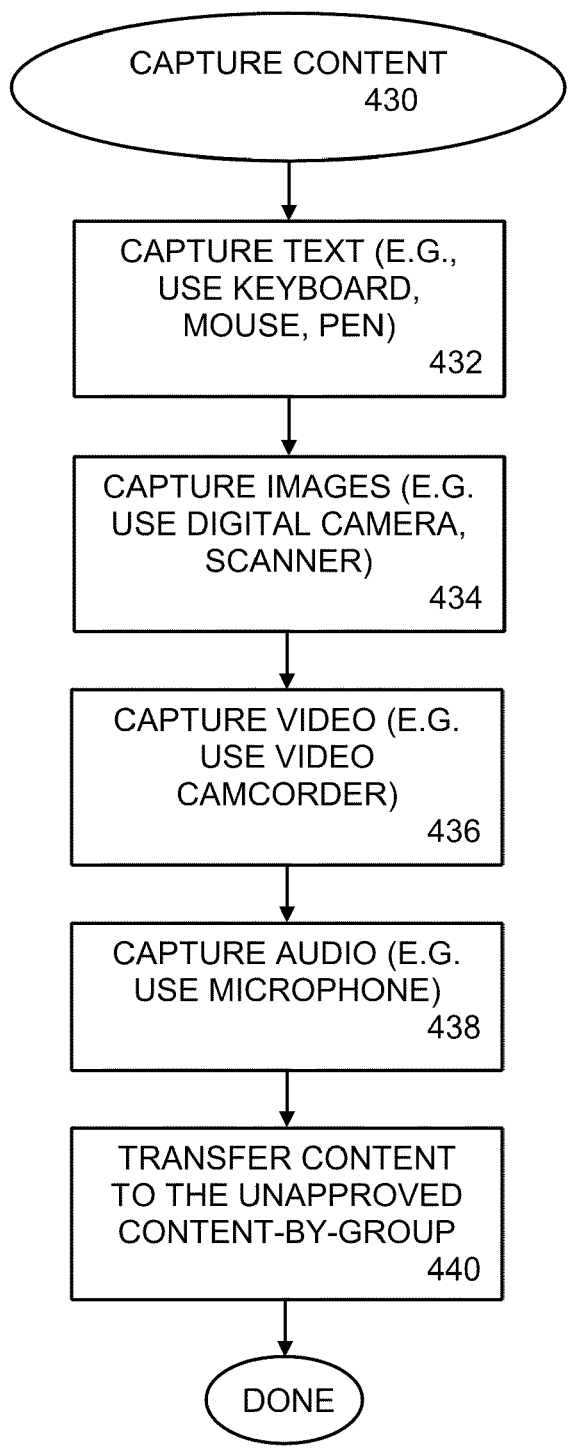
FIG. 11 illustrates a first flow chart of the present invention.

Referring to FIG. 11, a first flow chart of the present invention is shown. This is one example 430 of some typical steps involved in capturing content and others are anticipated as well as capturing content in different sequences. As known in the art, there are many ways to capture or enter content into a computer system and such is possible in many different sequences. For example, an image of a person is captured with a digital camera then the digital image is uploaded to a computer then some text is entered at a keyboard or with handwriting and associated with the digital image. In the example shown in FIG. 11, text is captured 432 using any of the known text input devices such as a keyboard, mouse, touch screen, scanner, pen-input, etc. Images are captured 434 using, for example, a digital camera, scanner, etc. Video is captured 436 using, for example, a digital camera or camcorder. Voice or music is captured 438 using, for example, a microphone. Once the content is captured, it is transferred or uploaded 440 to the unapproved content by group 58. Any sequence or combination of known methods of capturing content is anticipated and included here within.

Figure 12:
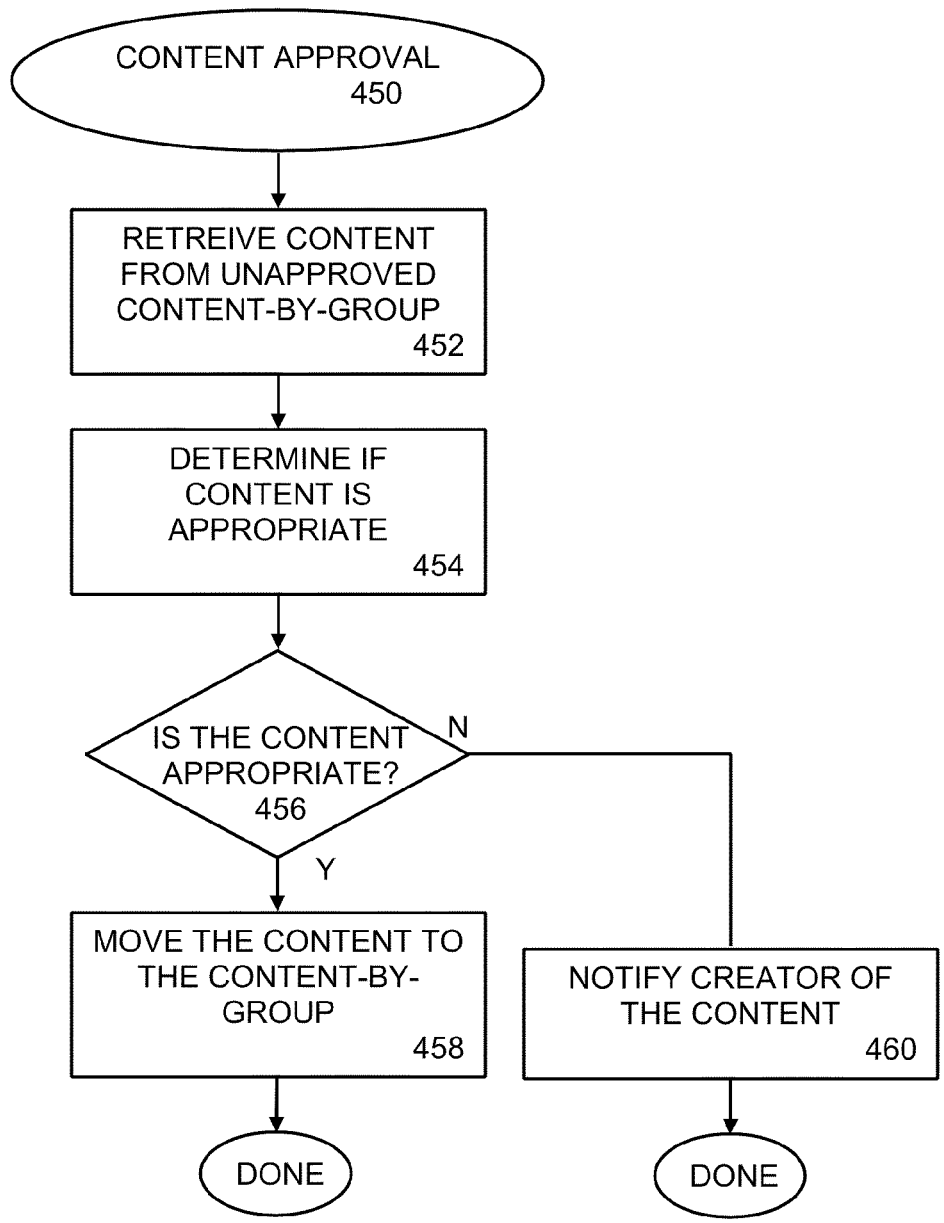
FIG. 12 illustrates a second flow chart of the present invention.

Referring to FIG. 12, a second flow chart of the present invention is shown. This flow 450 is an example of how an administrator views and determines if the uploaded content is appropriate for the target yearbook. For example, if the target yearbook is for a high school, nudity, foul language, obscene gestures, etc. are not appropriate. On the other hand, if the yearbook is for a production crew working on adult movies, then nudity might be appropriate. The flow begins with retrieving content 452 from the unapproved content by group 58. The content is retrieved as known in the industry, for example as an object such as an object relating to the photograph of one student, etc. Next, the administrator of content determines if the content is appropriate 454, for example, by reading the text, viewing the images/video and/or listening to the audio, as appropriate. If the content is appropriate 456, the administrator elects to move 458 the content to the content by group 54 file/database. If the content is not appropriate 456, the administrator notifies the creator 460, typically informing them of why the content is inappropriate.

Figure 13:
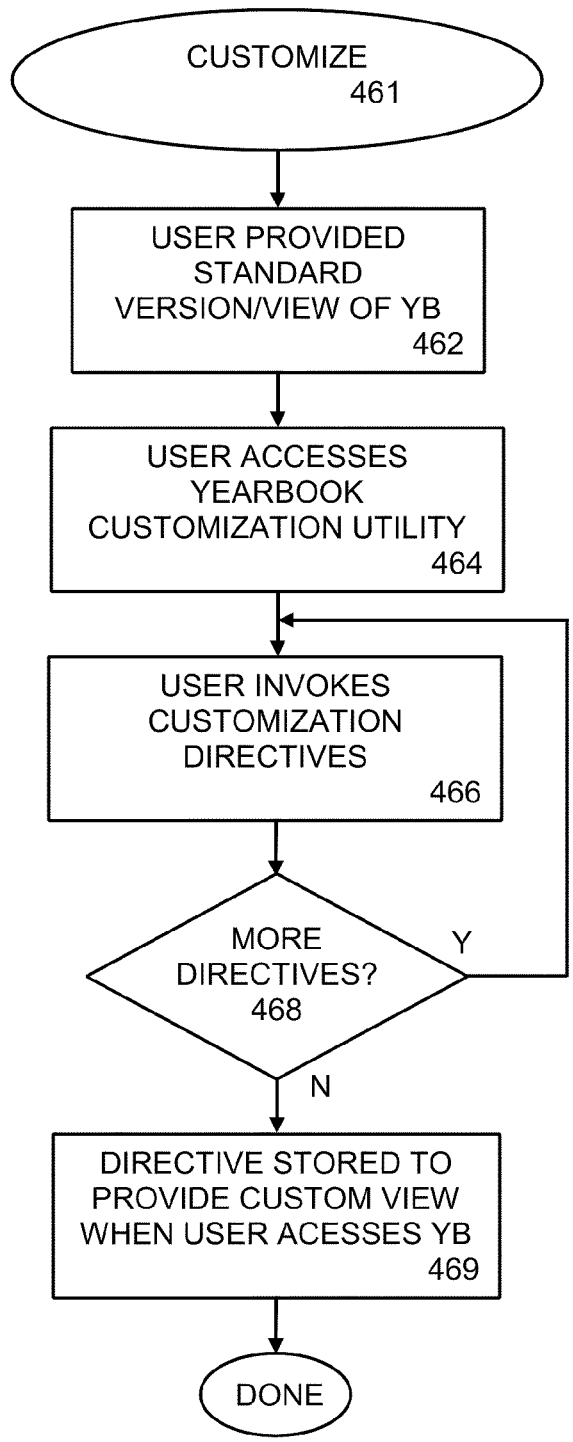
FIG. 13 illustrates a third flow chart of the present invention.

Referring to FIG. 13, a third flow chart of the present invention is shown. It is anticipated that, in some embodiments, all users (e.g. students) are provided with the same yearbook content and all users see the same content along with all of the robust features provided with the present invention. It is also anticipated that customization features be provided, enabling each user to customize the look of their own yearbook starting with the base yearbook content and filtering and/or adding to the base content. For example, one user indicates (profile) they are part of a certain team (e.g. football), making certain yearbook content related to football prominent while another student indicates that they are part of band, making other yearbook content related to band more prominent. Furthermore, in some examples, one user includes content that no other user includes such as messages from personal friends, etc. One possible flow 461 is show for an exemplary method for a user to customize the look and operation of their individual version of the yearbook. In such, the user is provided a standard, un-customized version or view of the yearbook 462. In such, it is preferred, though not required, that the yearbook be in a final or close-to-final state so that the user is working with a version that has content that is somewhat stable. In this exemplary method, the user accesses a yearbook customization utility 464. The yearbook customization utility 464 provides the user with a repertoire of directives or tools that support customization of the user's view and operation of the yearbook. For example, one such directive or tool provides the user with a tool to enter names of their friends to create a friends page as shown in FIGS. 8-9. Other directives provide, for example, background colors, themes, table of contents editing, content selection (e.g., select to include the soccer team), etc.

The user invokes as many directives as desired 466 until they are finished 468. The directives are stored 469 to provide the customized view to the user each time they access the yearbook (e.g. when access online version) or when physical media 32 is created (e.g. delivered on a DVD), such that the user's custom view will be represented on the physical media 32.

Figure 14:
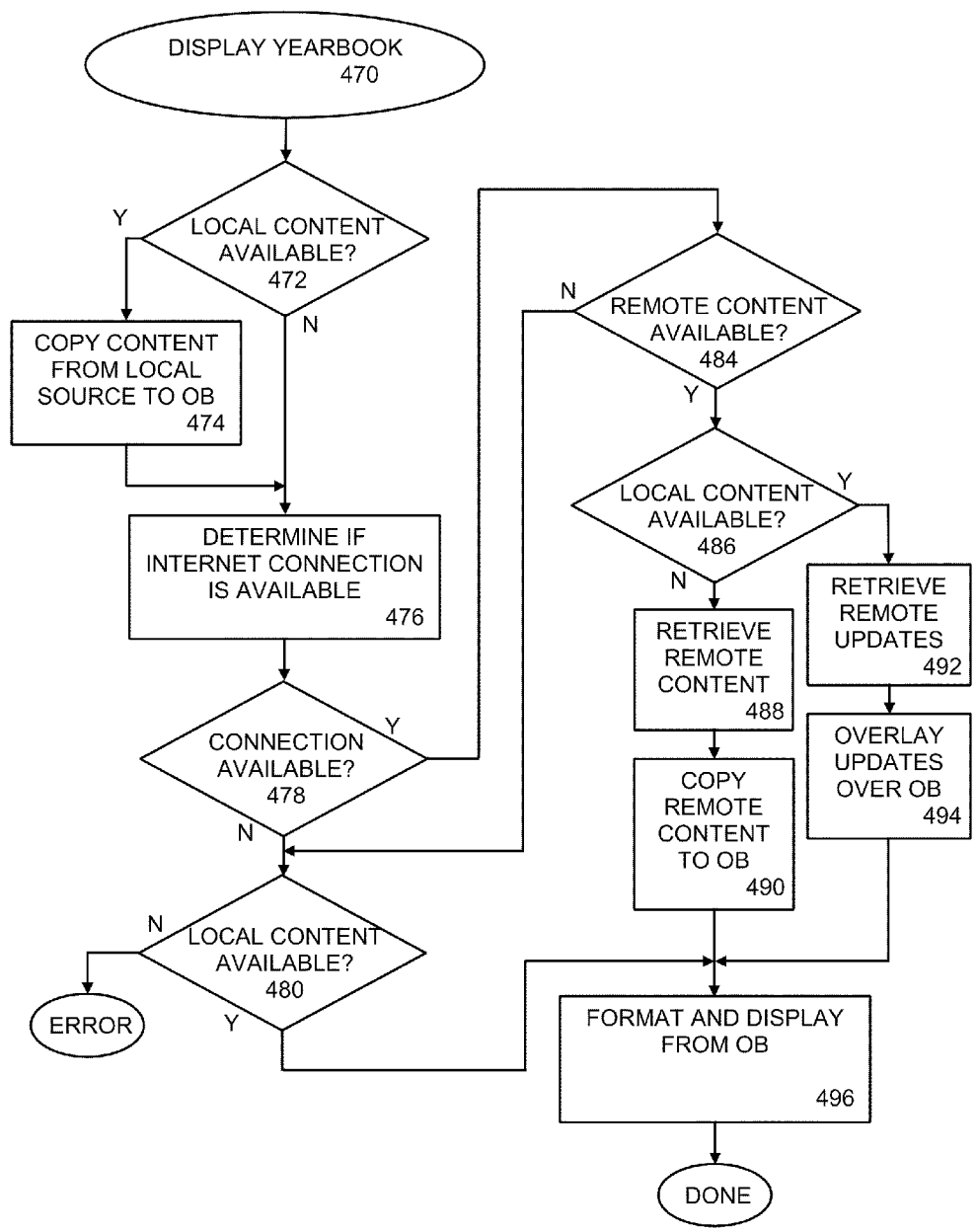
FIG. 14 illustrates a fourth flow chart of the present invention.

Referring to FIG. 14, a fourth flow chart of the present invention is shown. This is one possible flow 470 showing the display of yearbook content. If there is local content available 472, for example on a local computer hard drive or from a removable media (e.g. DVD), the content is retrieved 474 from the local source(s) and stored in, for example, an output buffer. Next, it is determined if an Internet connection is available 476. If no Internet connection is available 478 and no local content is available 480, an error occurred since there is no where to obtain the needed content. If no Internet connection is available 478 but local content is available 480, the content from the output buffer (OB) is formatted 496 and displayed (e.g. on display 360/365 or on television 62) for viewing by the user.

If an Internet connection is available 478 then it is determined if remote content is available 484. If no local content is available 486, the remote content is retrieved 488 (e.g., downloaded) and copied to the output buffer 490. If local content is available 486, the local content is already available in the output buffer (OB) and remote updates are retrieved 492 and the remote updates are used to overlay parts or all of the local content in the output buffer 494. For example, if the local content has the wrong image of one person and a corrected image is available in the content by group 54 on the server 50, the corrected image is downloaded from the server 492 and used to overwrite the wrong image in the output buffer 494. Finally, the content in the output buffer is formatted and displayed 496 for viewing by the user.

Figure 15:
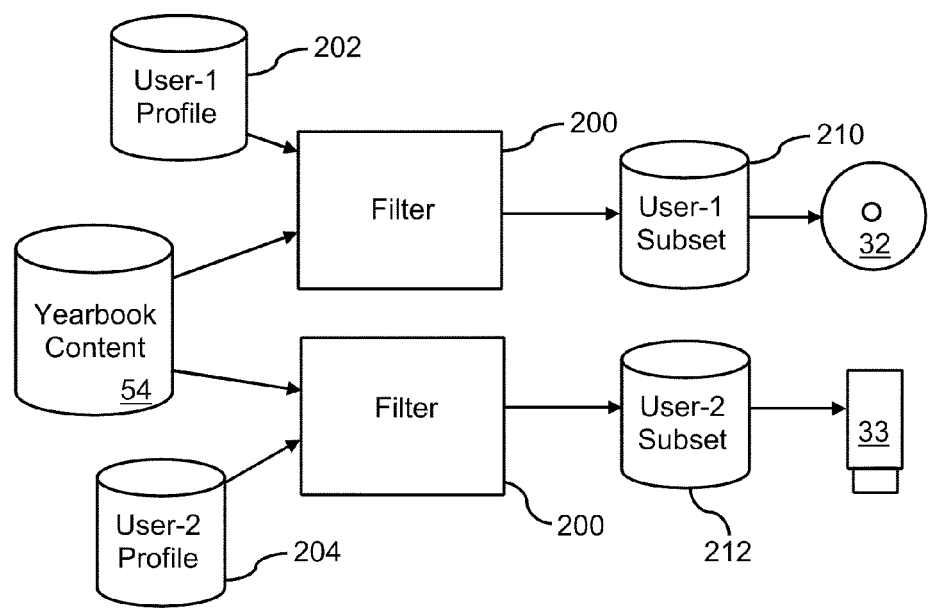
FIG. 15 illustrates a diagram of content filtering of the present invention.

Referring to FIG. 15, a diagram of content filtering of the present invention is shown. In this, the yearbook content 54 is filtered based on user profiles 202/204 by filters 200 and a user-subset 210/212 is saved for each user. This example shows a greatly simplified, two-user system and it is anticipated that a single yearbook will have many users with many user profiles. In this example, a first user has a user profile 202 and a second user has second user profile 204. For example, an entry in the first user profile indicates that the first user is a member of the high school band and an entry in the second user profile indicates that the second user is a member of the high school science club. In such, the filter 200 uses the first user profile 202 to select content that is customized for the first user and stores that content in user-1 subset 210 and uses the second user profile 204 to select content that is customized for the second user and stores that content in user-2 subset 212. In this example, the user-1 subset 210 is written to a removable optical media 32 (e.g. CD-ROM, DVD) and the user-2 subset 212 is written to a removable media disk 33 (e.g. jump drive). It is anticipated that the user-subsets 210/212 for many users be delivered in any known form including, but not limited to, online access, transfer through a network, rotating media (e.g. CD-ROM), removable media (e.g. flash drive, jump drive, compact flash, memory stick, etc) and the like.

Figure 16:
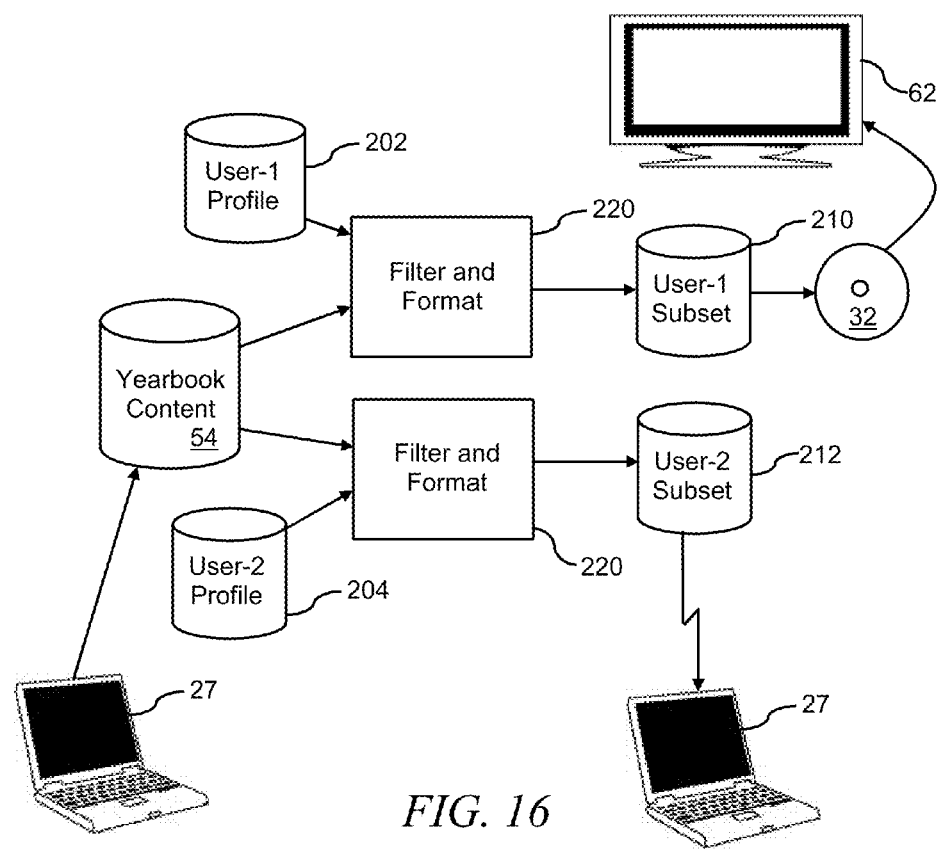
FIG. 16 illustrates a diagram of device specific content filtering of the present invention.

Referring to FIG. 16, a diagram of device specific content filtering of the present invention is shown. In this, the yearbook content 54 is created and uploaded from a user computer 27. The content 54 is filtered and formatted based on user profiles 202/204 and the target device that will be used by the user by filters 220 and a user-subset 210/212 is saved for each user. This example shows a greatly simplified, two-user system, each user having a different device. In this example, the first user will view the yearbook on a television equipped with an internal DVD player and the second user will view the yearbook on a personal computer 27. It is anticipated that a single yearbook will have many users with many user profiles and many types of output devices. In this example, a first user has a user profile 202 and a second user has second user profile 204. For example, an entry in the first user profile indicates that the first user is a member of the high school band and an entry in the second user profile indicates that the second user is a member of the high school science club. In such, the filter 220 uses the first user profile 202 to select content that is customized for the first user, formats the content for the device that the first user will use to display their yearbook content (e.g., a television 62 with integrated DVD player) and stores that content in user-1 subset 210. The filter 221 uses the second user profile 204 to select content that is customized for the second user, formats the content for the device that the second user will use to display their yearbook content (e.g., a personal computer 27) and stores that content in user-2 subset 212. In this example, the user-1 subset 210 is written to a removable optical media 32 (e.g. DVD disk) and the DVD disk is transferred to the user's television 62. The user-2 subset 212 is transferred to the second user's personal computer 27, preferably through a network connection. It is anticipated that the user-subsets 210/212 for many users be delivered in any known form including, but not limited to, online access, transfer through a network, rotating media (e.g. CD-ROM), removable media (e.g. flash drive, jump drive, compact flash, memory stick, etc) and the like.

Figure 17:
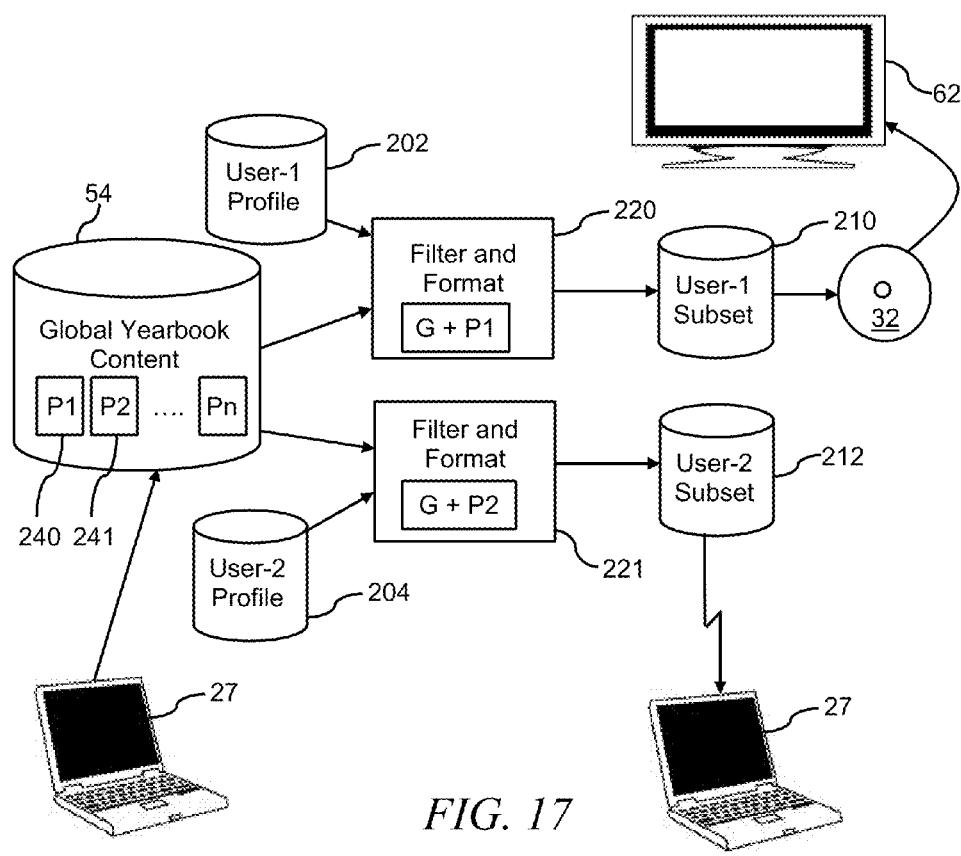
FIG. 17 illustrates a diagram of global and private content of the present invention.

Referring to FIG. 17, a diagram of global and private content of the present invention is shown. In this, the yearbook content 54 is created and uploaded from a user computer 27. The content 54 includes global content such as images and text for all users of the yearbook. The content 54 also includes one or more private contents P1, P2 . . . Pn 240/241. The private content 240/241 is associated with one or a subset of the users of the yearbook and is, for example, textual, audio or video annotations from other users such as another user's signature of one's yearbook. The content 54 is filtered and formatted based on user profiles 202/204 and, for example, the target device that will be used by the user by filters 220/221 and a user-subset 210/212 is saved for each user. A filter for the first user will include the global content and the private data for the first user 240 while the filter for the second user will include the global content and the private data for the second user 241 This example shows a greatly simplified, two-user system, each user having a different device. In this example, the first user will view the yearbook on a television equipped with an internal DVD player and the second user will view the yearbook on a personal computer 27. It is anticipated that a single yearbook will have many users with many user profiles and many types of output devices. In this example, a first user has a user profile 202 and a second user has second user profile 204. For example, an entry in the first user profile indicates that the first user is a member of the high school band and an entry in the second user profile indicates that the second user is a member of the high school science club. In such, the filter 220 uses the first user profile 202 to select content that is customized for the first user, formats the content for the device that the first user will use to display their yearbook content (e.g., a television 62 with integrated DVD player) and stores that content in user-1 subset 210. The filter 220 uses the second user profile 204 to select content that is customized for the second user, formats the content for the device that the second user will use to display their yearbook content (e.g., a personal computer 27) and stores that content in user-2 subset 212. In this example, the user-1 subset 210 is written to a removable optical media 32 (e.g. DVD disk) and the DVD disk is transferred to the user's television 62. The user-2 subset 212 is transferred to the second user's personal computer 27, preferably through a network connection. It is anticipated that the user-subsets 210/212 for many users be delivered in any known form including, but not limited to, online access, transfer through a network, rotating media (e.g. CD-ROM), removable media (e.g. flash drive, jump drive, compact flash, memory stick, etc) and the like. When the first user views the yearbook, they see their selection of global content (e.g. classmates, football, science team) along with their private data 240 (e.g. audio message from another class mate, signatures of football team overlayed on a full-team image). When the second user views the yearbook, they see their selection of global content (e.g. classmates, glee-club, cheerleading) along with their private data 241 (e.g. audio message from another class mate, signatures of other cheerleaders overlayed on an image of all of the cheerleaders).

Individual features shown in any of the examples presented work independently or in combination with any other feature shown and all combinations or isolated embodiments are anticipated and included here within.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for providing a formatted custom digital yearbook comprising:
   a server;
   a personal computer connected to the server through a network;
   a plurality of user devices selected from at least two types of user devices, each of the user devices associated with a user of the digital yearbook and each of the user devices capable of presenting media content on a display;
   a database operationally coupled to the server;
   a first software module running on the server receives yearbook data from the personal computer through the network and stores the yearbook data in the database;
   for each user of the formatted custom digital yearbook, a second software module running on the server extracts a subset of the yearbook data, the subset of the yearbook data being yearbook data that is approved for distribution;

a third software module further filters the subset of yearbook data by selecting custom yearbook data therefrom, according to selections by the user in a view by user file into a custom yearbook view the third second software module formats the subset of yearbook data custom yearbook view according to a target device of the at least two user devices and the third software module saves the custom yearbook view in non-volatile storage as a custom formatted yearbook file; and a means for delivering the formatted custom yearbook file to the target device.

2. The system for providing a formatted custom digital yearbook of claim 1, wherein each of the at least two types of user devices is selected from the group consisting of a personal computer, an electronic book, a cellular phone, a content player, a television with an integrated optical disk player, a network connected television and an optical disk player.

3. The system for providing a formatted custom digital yearbook of claim 1, wherein the subset of yearbook data includes all of the yearbook data.

4. The system for providing a formatted custom digital yearbook of claim 1, whereas the third software module saves the custom yearbook data to the custom formatted yearbook file on a storage media and the means for delivering the formatted custom yearbook file to the plurality of user devices includes at least one of the plurality of user devices reading the formatted custom yearbook file from the storage media.

5. The system for providing a formatted custom digital yearbook of claim 4, wherein the storage media is selected from the group consisting of digital optical media, analog optical media, magnetic media and flash memory.

6. The system for providing a formatted custom yearbook of claim 4, further comprising a fourth software module running on the plurality of user devices, the fourth software module reads the custom formatted yearbook file from the storage media, accesses external data, merges the external data with the formatted custom yearbook file from the storage media into a formatted custom yearbook view and presents the formatted custom yearbook view through a user interface.

7. The system for providing a formatted custom digital yearbook of claim 6, wherein the external data is selected from the group consisting of music, video, news and advertisements.

8. The system for providing a formatted custom digital yearbook of claim 1, whereas the means for delivering the custom yearbook view file to the target device includes a network.

9. A method for providing a formatted custom digital yearbook comprising the steps of:
capturing content for a yearbook into a database;
editing and organizing the content within the database;
creating a formatted custom yearbook file in non-volatile storage from the content by selecting custom yearbook data therefrom, based on selections by a particular user of a set of users in a view by user file of the particular user, the custom formatted yearbook file pre-formatted based on a target device of the particular user for receiving the formatted custom yearbook file, as indicated by the particular user in the view by user file;
delivering the formatted custom yearbook file to the target device associated with the particular user; and presenting the formatted custom yearbook file at the target device; wherein the target device includes at least two different classes of target devices.

10. The method of claim 9, wherein each of the at least two different classes of target devices is selected from the group consisting of a personal computer, an electronic book, a cellular phone, a content player, a television with an integrated optical disk player, a network-connected television and an optical disk player.

11. The method of claim 10, wherein the target device is an optical disk player and whereas the step of creating the formatted custom yearbook file includes formatting and organizing the content to work with a remote control based user interface.

12. The method of claim 10, wherein the target device is a personal computer and whereas the step of creating the formatted custom yearbook file includes formatting and organizing the content to work with a window-based user interface.

13. The method of claim 10, wherein the target device is an electronic book and whereas the step of creating the formatted custom yearbook file includes formatting and organizing the content to work with an electronic book user interface.

14. A method for providing a formatted custom digital yearbook, the method performed by a computer having instructions stored on a non-transitory computer readable media, the computer media interfaced to a computer, the computer executing the instructions to implement the method comprising the steps of:
capturing content for a yearbook into a database;
editing and organizing the content within the database;
creating a custom formatted yearbook file in non-volatile storage from the content by selecting custom yearbook data therefrom, based on selections by a particular user of a set of users in a view by user file of the particular user, the view by user file including an indication of a target device used by the particular user for receiving the formatted custom yearbook file,
delivering the formatted custom yearbook file to the target device; and
presenting the custom formatted yearbook file at the target device; wherein the target device includes at least two different classes of target devices.

15. The method of claim 14, wherein each of the at least two different classes of target devices is selected from the group consisting of a personal computer, an electronic book, a cellular phone, a content player, a television with an integrated optical disk player, a network-connected television and an optical disk player.

16. The method of claim 14, wherein the target device is an optical disk player and whereas the step of creating the formatted custom yearbook file data includes formatting and organizing the content to work with a remote control based user interface.

17. The method of claim 14, wherein the target device is a personal computer and whereas the step of creating the formatted custom yearbook file includes formatting and organizing the content to work with window-based user interface.

18. The method of claim 14, wherein the target device is an electronic book and whereas the step of creating the formatted custom yearbook file includes formatting and organizing the content to work with an electronic book user interface.

19. The method of claim 16, wherein the formatted custom yearbook file is formatted and organized by pages and the remote control based user interface provides page turn and direct page access functionality.

20. The method of claim 17, wherein the formatted custom yearbook file is formatted and organized in for a windows-based device and the window-based user interface provides rich user interface features including page turns, searching, annotation and extraction.

* * * * *